Jan. 3, 1967        D. F. HAGEN        3,295,353
DIFFERENTIAL THERMAL DETECTOR SYSTEM
Filed April 30, 1964
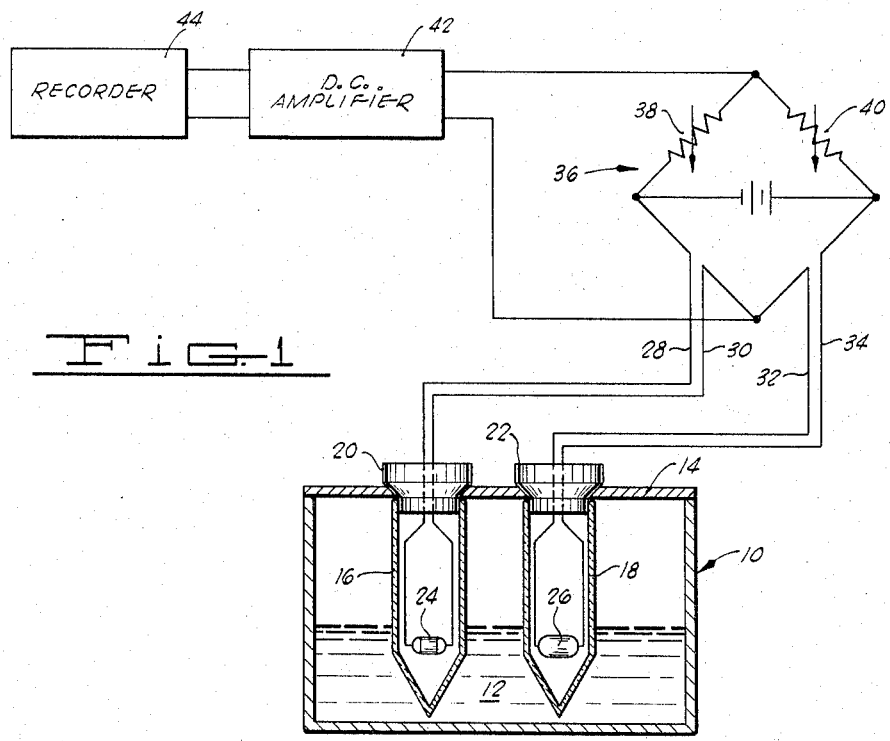
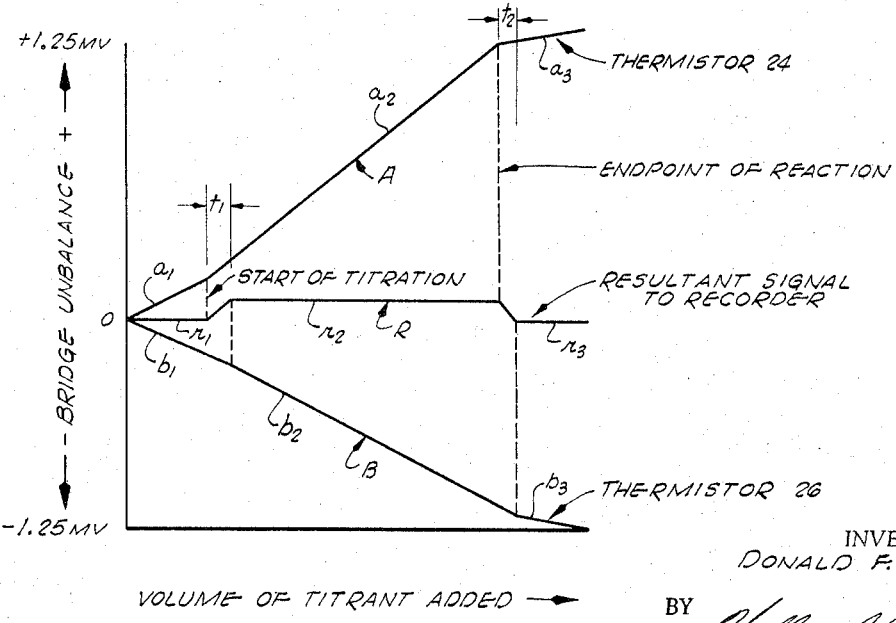
INVENTOR.
DONALD F. HAGEN
BY *William J. Miller*
ATTORNEY

United States Patent Office 3,295,353
Patented Jan. 3, 1967

3,295,353
DIFFERENTIAL THERMAL DETECTOR SYSTEM
Donald F. Hagen, St. Paul, Minn., assignor to Continental Oil Company, Ponca City, Okla., a corporation of Delaware
Filed Apr. 30, 1964, Ser. No. 363,924
1 Claim. (Cl. 73—362)

This invention relates to a system for detecting small changes in the temperature of the environment of the system. More particularly, but not by way of limitation, the present invention relates to a differential thermal detector system which is useful for the detection of small changes in the temperature of a chemical reaction mixture, which changes are of the magnitude of the type resulting from titrations used in neutralization and redox chemical reactions.

The use of heat sensitive electrical resistors of the type termed thermistors for the purpose of detecting changes in temperature is well known in the art. A thermistor is generally understood to be an element of the nature of an electrical resistor having a large temperature coefficient of resistance. Thermistors are possessed of the general characteristic of decreasing markedly in electrical resistance as the temperature environment of the transistor increases. This characteristic is in direct contrast to the characteristic of ordinary resistors which normally have but a small positive temperature coefficient, their resistance increasing slightly as the temperature rises and decreasing as the temperature falls. Thermistors are very practical devices for the measurement of temperatures from very high to very low values, and are generally used in electrical circuits whenever a thermally sensitive variable resistor can be used for temperature measurement, control or compensation.

One of the ways in which thermistors have been previously employed as a temperature measuring device involves the measurement of the heat of reaction occurring in a reaction medium as a chemical reaction progresses. In the most conventional technique utilizing thermistors for reaction temperature measurements, a single thermistor is used to follow the heat evolution in the course of the reaction, and the resulting electrical signal is recorded and is directly proportional to the temperature in the reaction medium.

In some temperature measuring systems of more recent design, a pair of thermistors is employed to sense the changing temperature of the reaction medium or other environment. This change in temperature is continuously determined or monitored by observing the manner in which the difference in the electrical resistances of the two thermistors varies. Two-thermistor systems of this type are employed, for example, where the heat changes in the thermistor environment are of a low order, so that the changes in temperature which occur are magnified by the much larger change in the difference in the electrical resistances of the two thermistors. In most instances, the two thermistors which are used in these systems are disposed in two different environments, one being a reference or standard environment, and the other being the environment to be measured. Thus, in the case of the system disclosed in Richardson United States Patent 2,732,- 710, one of the thermistors is disposed in a moisture-laden air environment, and the other is disposed in a hygroscopic material through which the moisture-laden air is passed and which absorbs the moisture from the air and, in so doing, generates heats. The difference between the temperature of the environment of the two thermistors is indicated by the difference in the electrical resistance of the two thermistors and this in turn provides a measure of the moisture content of the air.

In Ledin United States Patent 2,578,890, a pair of thermistors are employed for controlling the temperature in an oven so as to maintain object placed in the oven at a desired temperature. One of the thermistors used in the temperature control system is placed in contact with the metal body which is confined within the oven. A second thermistor is placed in the oven chamber and spaced from the metal object. Resistance readings from the two thermistors are compared, and the oven temperature is adjusted based on such comparison so as to bring the metal object smoothly and precisely to a desired temperature, and to afford a continuous, accurate measurement of the surface temperature of the metallic object.

The present invention is a novel dual thermistor differential thermal detector system which may be used to accurately detect end points or other reference points in time during the course of chemical reactions. The system is based, as in some prior art patents on such devices, upon the use of a differential signal from two thermistors. In the system of the present invention, however, both of the thermistors are placed in the reaction medium, and one of the thermistors is constructed to give a delayed response to changes in the temperature of its environment. The second thermistor is constructed to have a normal, non-delayed response to changes in the temperature of its environment, and thus, in general, displays a faster response to such changes than the first thermistor. In the described system, the thermistor having a delayed response to temperature changes acts as a reference with respect to the other, instantly responding thermistor, and the resultant of the responses from the two thermistors is continuously recorded. The resultant signal shows marked inflection points when changes occur in the rate of heat evolution in the environment of the thermistors. These inflection points can be used to determine the point at which a chemical reaction is commenced, and at which the reaction is terminated (end point), or other similar reference points involving heat changes of a relatively low order of magnitude which occur over a relatively small increment of time as related to the entire period of time over which the system is to be observed.

In a preferred embodiment of the invention, the ability to provide a delayed response to changes in the environmental temperature is attained in the delayed response thermistor by enclosing this thermistor in some type of heat insulating medium, such as a high temperature wax. With this construction, changes in the temperature of the environment of the thermistor are more slowly transmitted to, and sensed by, the thermistor, and the delayed response gives an inflection point when such thermistor is compared with a substantially instantaneously responding thermistor.

A major object of the described invention is to provide a sensitive and accurate system for detecting small changes in heats of reactions of the type occurring at the commencement of and end points of chemical reactions.

Another object of the invention is to provide a differential thermal detector system which may be used to quickly and easily identify the end point of a chemical reaction.

Another object of the invention is to provide a dual thermistor differential thermal detector system which is very simple in construction, yet which is rugged and characterized by a long and trouble-free service life.

In addition to these objects and advantages of the invention, additional objects and advantages will become apparent as the following detailed description of the invention is read in conjunction with a perusal of the accompanying drawings which illustrate the invention.

In the drawings:

FIGURE 1 is a partially schematic diagram illustrating one embodiment of the system of the present invention. A predominant portion of the electrical circuitry is schematically illustrated, and the mechanical portions of the system which include the thermistor probes are illustrated in section. The thermistors used in the system are illustrated in elevation.

FIGURE 2 is a diagram illustrating the manner in which the delayed response characteristic of one of the thermistors used in the system of the present invention is used to develop a resultant signal indicative of the point in time at which a chemical reaction is commenced, and the end point occurring at the time when such reaction is completed.

Referring now to the drawings in detail, and particularly, to FIGURE 1, reference character 10 designates a vessel or suitable container containing a solution 12 which is a medium in which a chemical reaction is to be carried out. Typically, the solution 12 may be an acid or a base which is to be subjected to titration with a standard acid or base for the purpose of determining its pH or neutralization equivalency. In this instance, as will be understood by those skilled in the art, the top 14 of the vessel 10 will be apertured or otherwise opened (not seen in the drawing) to permit a burette or other suitable volumetrically calibrated instrument to be positioned above the solution 12 for delivering the standard solution used in the titration into the solution 12.

Although standardization of a reagent by a titration procedure has been suggested as one typical application of the present invention, it should be borne in mind that many other types of chemical reactions involving small heats of reaction may also be monitored through the use of the system of the present invention, and the reference to the titration procedure is not intended to be limiting upon the scope of the invention.

A pair of hollow glass probes 16 and 18 which are substantially identical in geometric configuration and in thermal characteristics are partially immersed in the solution 12 and are in some manner suitably retained in fixed position therein. This may be accomplished by the use of stoppers 20 and 22 which are constructed of an insulating material, and are tapered so as to facilitate the support of the stoppers and the glass probes 16 and 18 affixed thereto in apertures formed in the top 14 of the vessel 10. Any other suitable means of supporting the probes 16 and 18 with their ends immersed in the solution 12 may also be employed, this particular feature not constituting a critical aspect of the invention.

Disposed in the lower end of the probes 16 and 18 and preferably at a horizontal level which is below the surface of the solution 12 are a pair of thermistors designated by reference characters 24 and 26, respectively. In actuality, only the thermistor 24 may be directly perceived in referring to FIGURE 1 since the thermistor 26 is coated with a heat insulating medium, such as a high temperature wax. The purpose of the coating of heat insulating material will be subsequently explained.

The thermistors 24 and 26 are connected by electrical leads 28 and 30, and 32 and 34, respectively, in two of the legs of a Wheatstone bridge circuit designated generally by reference character 36. The bridge 36 is constructed in the conventional manner with a pair of adjustable balancing resistors 38 and 40 positioned in the remaining legs of the bridge. The output from the bridge 36 is passed through a D.C. amplifier 42 to a recorder 44 where the signal resulting from an electrically unbalanced condition of the bridge is recorded on a strip chart in a conventional manner.

*Operation*

The operation of the thermal detector system of the present invention may best be discussed in conjunction with an explanation of FIGURE 2 of the drawings. With the system assembled as shown in FIGURE 1, changes in the temperature of the environment of the probes 16 and 18 are transmitted through the glass walls of the probes to the thermistors 24 and 26 enclosed therein. Although the thermistors 24 and 26 may be immersed in the solution 12 in direct contact therewith, it is preferred to use the probes 16 and 18 to protect the thermistors from corrosive attack and to damp out any thermal gradients to which they may be exposed as a result of agitation of the solution 12 or localized development of a heat of reaction which differs from the heat in the remainder of the solution. Preferably, the probes 16 and 18 are constructed of a material having a relatively high thermal conductivity, and are matched as nearly as possible to provide a substantially equal heat transmission to the thermistors which are enclosed therein.

Assuming that it is desired to titrate the solution 12 with a standard solution (to adopt a typical application of the invention for discussion purposes), the titrant is introduced to the solution 12 dropwise in a manner well understood in the art. Prior to the commencement of the introduction of the titrant in this manner, however, the balancing resistors 38 and 40 are adjusted so that the output from the bridge 36 gives a signal of constant potential, and preferably zero potential. This is indicated on FIGURE 2 where the voltage drop across the non-insulated thermistor 24 is represented by line A, the voltage drop across the thermistor 26 coated with a heat insulating material is designated by line B, and the resultant output signal from the bridge 36 is designated by line R. Prior to the time the titration is commenced, the normal or ambient heat of the solution 12 is transmitted through the probes 16 and 18 to the thermistors 24 and 26 and results in the occurrence of a change in the potential drop across the thermistors 24 and 26 as evidenced by the portions $a_1$ and $b_1$, respectively, of line A and B. By proper adjustment of the balancing resistors 38 and 40, the bridge 36 may be balanced during this period to give substantially no output signal as indicated by the portion $r_1$ of the resultant line R.

As the titration is commenced, the rates vary at which the electrical resistance of the thermistors 24 and 26 are changed by changes in the temperature of their environment. This is reflected by the change in the slopes of the lines A and B. It will be perceived in referring to FIGURE 2, however, that because of the heat insulating medium which surrounds the transistor 26, the heat of reaction which is generated in the solution 12 as the titrant commences to be mixed therewith does not reach the thermistor 26 until the occurrence of a time delay $T_1$ following the substantially instantaneous response of the thermistor 24. The instantaneous change in slope of the line A representing the response of the thermistor 24 causes an unbalanced condition in bridge 36, and a change in the slope of the line R representing the resultant of the potential drop across the two thermistors or the output of the bridge 36.

After the transpiration of the time delay $T_1$ necessary for the insulated thermistor 26 to respond to the heat of reaction generated by the titration, both the thermistors 24 and 26 continue to undergo a uniform change in their electrical resistance as the titration proceeds. The continuous and uniform change in the electrical resistance of each of the thermistors 24 and 26 is represented by the portions $a_2$ and $b_2$ of lines A and B, respectively. A constant output signal is developed by the bridge 36 and, after amplification, is recorded as the portion $r_2$ of line R on the recorder 44.

When the end point of the titration is reached, no further chemical reaction between the titrant and the solution 12 occurs. Accordingly, there is no further evolution of heat of reaction when the end point is reached. As a result of the discontinuation of the chemical reaction, the non-insulated thermistor 24 responds substantially instantaneously to the cessation of heat evolution and a second change in the slope of line A occurs. Subsequently, to the end point of the reaction, the electrical resistance of the thermistor 24 changes only in response to the conduction of the final heat of the reaction mixture to the thermistor, and the potential drop across the thermistor 24 is represented by the portion $a_3$ of the line A.

Due to the delay in response occasioned by the insulating coating of high temperature wax, the thermistor 26 does not respond to the occurrence of the reaction end point until the passage of a time interval $T_2$. Following the passage of time $T_2$ after the end point is reached, the line B representing the potential drop across thermistor 26 undergoes a change in slope so that the portion $b_3$ of line B is then developed.

An operator of the differential thermal detector system of the invention, in observing the trace scribed upon the continuous chart of the recorder 44, will perceive the development of the line R representing the output from the bridge 36 or, stated differently, will observe the resultant of the changes in the potential drop across the two thermistors 24 and 26. In referring to the chart trace R, the operator can easily determine from the inflections in the trace the time when the reaction is commenced, and the time when the end point of the reaction is reached. If the titrant is added to the solution 12 at a uniform rate, the ordinate or the chart can be calibrated in terms of volume of titrant added, and the total volume of titrant required for a neutralization can be thus automatically determined.

From the foregoing description of the invention, it will have become apparaent that a simple and relatively inexpensively constructed device is provided for quickly and accurately detecting changes in the temperature of a medium, which changes are relatively small in magnitude and which are of the order of the changes in heats of reactions occurring in the course of titrametric chemical reactions. The differential thermal detector system of the invention may be made to be substantially automatic in its operation, and may be utilized by a relatively unskilled operator for detecting the end point of a chemical reaction, and for determining the quantity of a particular reactant which has entered into the reaction.

Although the foregoing description of the invention sets forth certain details of structure and modes of operation which are characteristic of a specific embodiment of the invention and a particular application thereof, it is to be understood that numerous changes may be made in the precise structure described, and in the method of utilizing and applying the invention without the involvement of a departure from the basic principles upon which the invention is based. For example, as hereinbefore indicated, the glass probes 16 and 18 may be replaced by a number of other different types of shielding or enveloping structures, or may be dispensed with altogether under certain circumstances. Also, the type of construction of one of the two thermistors in the dual thermistor system for the purpose of delaying the time required for the thermistor to respond to changes in the temperature of its environment may be accomplished in a number of different ways, only one of which is described in this application. It should also be understood that although the balancing resistors 38 and 40 used in the bridge circuit are adjusted in the described mode of operation to provide a resultant output signal from the bridge 36 having the characteristics illustrated in FIGURE 2, other types of resultant signals may be made to occur which differ geometrically from that shown in FIGURE 2, and have in common therewith only the presence of inflection points indicative of major changes in the heat content of the chemical system.

Insofar as the described changes and others which may be perceived by those skilled in the art do not involve a departure from the basic principles upon which the invention is founded, it is intended that these changes be considered as circumscribed by the spirit and scope of invention except as the same may be necessarily limited by the appended claims or reasonable equivalents thereof.

What is claimed is:

In a system for detecting thermal changes in a chemical reaction:

a container for enclosing chemical reactants;

first and second thermistors carried within said container;

a heat insulating medium comprising a high melting point wax coated on said second thermistor to delay the effect of said thermal change thereon;

a tubular glass member enclosing said first and second thermistors for protecting said thermistors from said chemical reactants while permitting said thermistors to respond to thermal changes occurring in said reactants and outside said thermally conductive means;

a Wheatstone bridge circuit having first and second legs connected with said first and second thermistors, respectively, and having a variable resistor in each remaining leg thereof;

an amplifier connected to said Wheatstone bridge circuit for receiving the output therefrom; and a recorder connected with said amplifier.

References Cited by the Examiner

UNITED STATES PATENTS

| | | | |
|---|---|---|---|
| 1,994,757 | 3/1935 | De Florez | 73—342 |
| 2,266,185 | 12/1941 | Fillo | 73—341 |
| 2,813,425 | 11/1957 | Woolley | 73—341 |
| 2,904,995 | 9/1959 | Obermaier | 73—359 |
| 3,022,669 | 2/1962 | O'Brien | 73—359 |
| 3,139,752 | 7/1964 | Giedt | 73—359 |

LOUIS R. PRINCE, *Primary Examiner.*

DONN McGIEHAN, *Assistant Examiner.*